(12) United States Patent
Mizoguchi et al.

(10) Patent No.: US 10,167,945 B2
(45) Date of Patent: Jan. 1, 2019

(54) DIFFERENTIAL GEAR

(71) Applicant: TOYOTA JIDOSHA KABUSHIKI KAISHA, Toyota-shi, Aichi-ken (JP)

(72) Inventors: Norihiro Mizoguchi, Toyota (JP); Susumu Okada, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/379,882

(22) Filed: Dec. 15, 2016

(65) Prior Publication Data

US 2017/0175876 A1 Jun. 22, 2017

(30) Foreign Application Priority Data

Dec. 16, 2015 (JP) .................................. 2015-245491

(51) Int. Cl.
*F16H 57/04* (2010.01)
*F16H 48/08* (2006.01)
*F16H 57/037* (2012.01)

(52) U.S. Cl.
CPC ......... *F16H 57/0483* (2013.01); *F16H 48/08* (2013.01); *F16H 57/037* (2013.01);
(Continued)

(58) Field of Classification Search
CPC .... F16H 57/0483; F16H 48/08; F16H 57/037; F16H 57/0423; F16H 57/0424; F16H 57/042; F16H 57/0457
See application file for complete search history.

(56) References Cited

U.S. PATENT DOCUMENTS 2,147,146 A * 2/1939 Carlson .................. B60R 17/00
184/11.1
4,175,643 A * 11/1979 Jenkins ............... F16H 57/0457
184/11.2
(Continued)

FOREIGN PATENT DOCUMENTS

DE 102010003467 A1 * 1/2011 ......... F16H 57/0457
EP 3109513 A2 * 12/2016 ............. F16H 48/08
(Continued)

OTHER PUBLICATIONS

Definition of Restrain, taken from www.merriamwebster.com on Jan. 5, 2017.*
(Continued)

*Primary Examiner* — Stacey A Fluhart
(74) *Attorney, Agent, or Firm* — Oliff PLC

(57) ABSTRACT

A gear is configured such that: a ring gear, a drive pinion shaft having a pinion gear meshing with the ring gear, and rolling bearings supporting the drive pinion shaft such that the drive pinion shaft is rotatable are accommodated in a differential housing; the differential housing is divided into a differential mechanism chamber in which to accommodate the ring gear, and a pinion shaft chamber in which to accommodate the rolling bearings; and a feed oil passage configured to supply lubricant scooped up by the ring gear to the pinion shaft chamber, and a return oil passage configured to discharge the lubricant in the pinion shaft chamber to the differential mechanism chamber are provided in the differential housing. In the differential gear, an inlet of the feed oil passage is placed at a position that is offset from the ring gear in an axial direction of the ring gear.

5 Claims, 5 Drawing Sheets

(52) U.S. Cl.
CPC ..... *F16H 57/0423* (2013.01); *F16H 57/0424* (2013.01); *F16H 57/0457* (2013.01); *F16H 57/0471* (2013.01)

(56) References Cited

U.S. PATENT DOCUMENTS

| | | | |
|---|---|---|---|
| 8,409,044 B2* | 4/2013 | Hilker | F16H 48/38 475/160 |
| 2010/0043581 A1* | 2/2010 | Kincaid | F16H 57/027 74/424 |
| 2010/0144480 A1* | 6/2010 | Downs | F16H 57/0457 475/160 |
| 2012/0172167 A1 | 7/2012 | Myers et al. | |
| 2015/0057125 A1* | 2/2015 | Pump | F16H 48/08 475/160 |

FOREIGN PATENT DOCUMENTS

| | | | | |
|---|---|---|---|---|
| JP | S61-191548 U | 11/1986 | | |
| JP | H08-247260 A | 9/1996 | | |
| JP | 2002-147583 A | 5/2002 | | |
| JP | 2006-064056 A | 3/2006 | | |
| JP | 2008-002476 A | 1/2008 | | |
| JP | 2011163538 A | * | 8/2011 | ......... F16H 57/0483 |

OTHER PUBLICATIONS

Partial Translation of Office Action Issued in Japanese Application No. JP 2015-245491.

\* cited by examiner

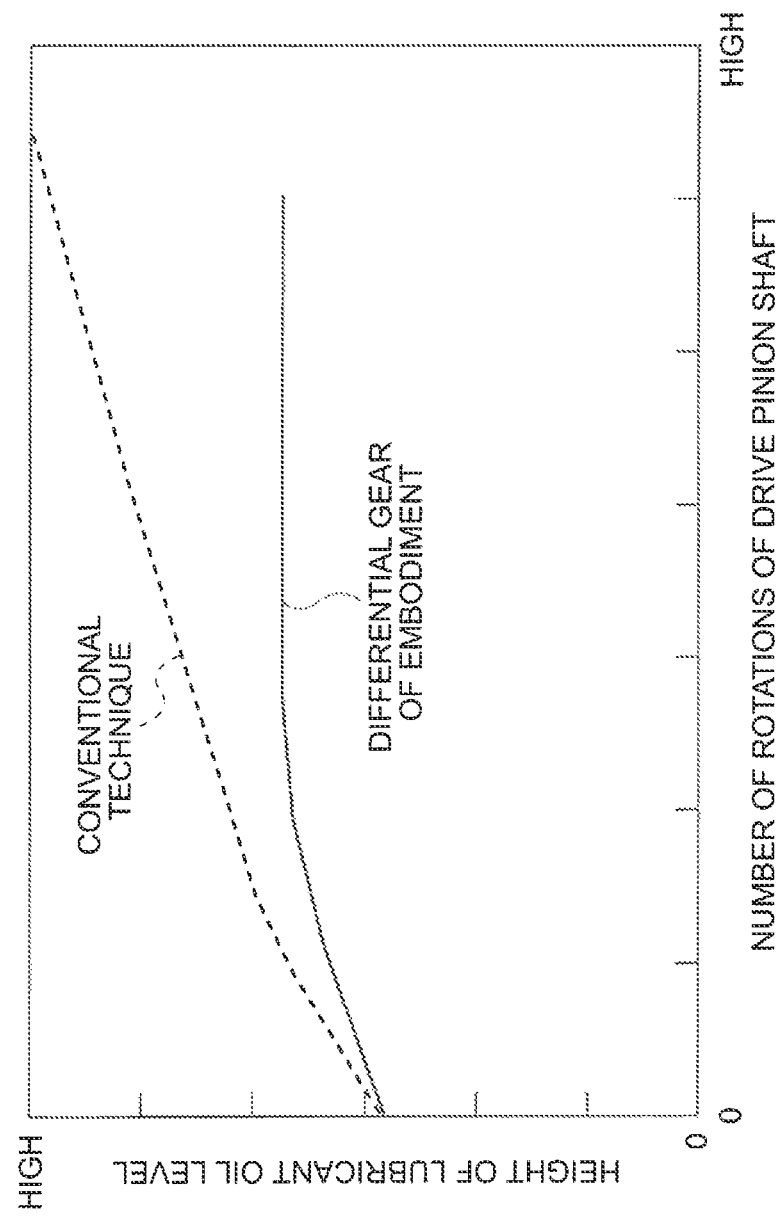

DIFFERENTIAL GEAR

INCORPORATION BY REFERENCE

The disclosure of Japanese Patent Application No. 2015-245491 filed on Dec. 16, 2015 including the specification, drawings and abstract is incorporated herein by reference in its entirety.

BACKGROUND

1. Field of the Disclosure

The disclosure relates to a differential gear including a final drive mechanism and a differential gear mechanism, and particularly, to a differential gear that can restrain a failure occurrence at the time of lubrication of a rolling bearing included in a final drive mechanism.

2. Description of Related Art

As a differential gear (differential) of an automobile, there has been generally known a differential gear in which to accommodate a final drive mechanism including a ring gear, a drive pinion shaft having a pinion gear meshing with the ring gear, and a rolling bearing supporting the drive pinion shaft, and a differential gear mechanism to which the ring gear is bolt-fastened.

In such a differential gear, it is necessary to lubricate the gear and the bearing by lubricant in order to prevent damage or the like to them, and a technique for this purpose is proposed.

For example, in Japanese Patent Application Publication No. 2002-147583 (JP 2002-147583 A) as one example of the related art of the disclosure, a differential housing includes: a differential mechanism chamber in which to accommodate a differential gear mechanism and a ring gear bolt-fastened thereto; and a pinion shaft chamber in which to accommodate a drive pinion shaft and a rolling bearing that supports the drive pinion shaft such that the drive pinion shaft is rotatable. In the differential housing, a feed oil passage for supplying lubricant scooped up by the ring gear to the pinion shaft chamber, and a return oil passage or discharging the lubricant in the pinion shaft chamber to the differential mechanism chamber are provided.

In this case, the lubricant thus scooped up by the ring gear flows into an inlet of the feed oil passage, and then enters the pinion shaft chamber through the feed oil passage. The lubricant thus supplied to the pinion shaft chamber lubricates the rolling bearing, etc., in the pinion shaft chamber, and is then discharged to the differential mechanism chamber through the return oil passage.

Note that, in this related art, the feed oil passage is provided at a position that is offset from the pinion shaft chamber to a ring-gear side in a lateral direction (that is, an axial direction of the ring gear), and the inlet thereof is opened toward a differential-mechanism-chamber side and formed at a position opposed to the ring gear in a radial direction. Accordingly, in this related art, most of the lubricant scooped up by the ring gear enters the pinion shaft chamber, so a sufficient amount of the lubricant can be supplied to the rolling bearing, etc., in the pinion shaft chamber.

In order to bring out and maintain original performance of the rolling bearing and to keep the bearing usable until its calculated life, it is indispensable to lubricate the rolling bearing appropriately. Accordingly, in the related art, the rolling bearing is lubricated by supplying, to the pinion shaft chamber, the lubricant at an amount that immerses the whole rolling bearing in the lubricant.

In the meantime, in the differential, it has been known that, while the device is used, metal abrasion powder (foreign matter) is generated due to repeated meshing and the like between gear wheels, and the foreign matter is mixed in the lubricant. In a state where the rolling bearing is lubricated by the lubricant in which such a foreign matter is mixed, the rolling bearing is damaged earlier than the calculated life of the bearing, starting from a failure occurrence on a bearing raceway surface or the like due to biting of the foreign matter.

In order to improve this problem, it is necessary to prevent the whole bearing from being immersed in the lubricant in which the foreign matter is mixed as much as possible. For this purpose, it is necessary to restrain the supply of the lubricant to the rolling bearing.

However, in the related art, when a rotation speed (the number of rotations) of the ring gear increases, the amount of the lubricant to be scooped up accordingly is increased. As a result, an amount of the lubricant to flow into the feed oil passage becomes larger than that of the lubricant to be discharged from the return oil passage, which frequently causes a poor lubrication state in which the whole rolling bearing is immersed in the lubricant in which the foreign matter is mixed.

On that account, in the related art, a failure of the rolling bearing easily occurs, and it is necessary to improve this problem.

SUMMARY

An object of the disclosure is to provide a differential gear that can restrain a failure occurrence at the time of lubrication of a rolling bearing included in a final drive mechanism.

A differential gear according to one aspect of the disclosure is configured such that: a ring gear, a drive pinion shaft having a pinion gear meshing with the ring gear, and rolling bearings supporting the drive pinion shaft such that the drive pinion shaft is rotatable are accommodated in a differential housing; the differential housing is divided into a differential mechanism chamber in which to accommodate the ring gear, and a pinion shaft chamber in which to accommodate the rolling bearings; and a feed oil passage configured to supply lubricant scooped up by the ring gear to the pinion shaft chamber, and a return oil passage configured to discharge the lubricant in the pinion shaft chamber to the differential mechanism chamber are provided inside the differential housing. An inlet of the feed oil passage is placed at a position that is offset from the ring gear in an axial direction of the ring gear.

The differential gear according to one aspect of the disclosure may further include a restraining member configured to restrain an inflow of the lubricant flowing to the inlet, of the lubricant scooped up by the ring gear.

In the differential gear according to one aspect of the disclosure, the whole feed oil passage may extend above the drive pinion shaft.

In the differential gear according to one aspect of the disclosure, the inlet of the feed oil passage is placed at a position offset from the ring gear in the axial direction of the ring gear so as to restrain an inflow of the lubricant to the feed oil passage. In this case, the inlet of the feed oil passage is placed at a position where a flow of the lubricant scooped up by the ring gear cannot easily enter therein. By such arrangement of the inlet, the inflow of the lubricant to the inlet of the feed oil passage is restrained, thereby making it possible to restrain lubricant in which a foreign matter is mixed from being supplied to the rolling bearings.

Further, the differential gear according to one aspect of the disclosure is provided with the restraining member configured to restrain the inflow of the lubricant directly flowing to the inlet of the feed oil passage, of the lubricant scooped up by the ring gear. By the restraining member, the inflow of the lubricant to the inlet of the feed oil passage is restrained, thereby making it possible to restrain lubricant in which a foreign matter is mixed from being supplied to the rolling bearings.

Further, in the differential gear of one aspect of the disclosure, the whole feed oil passage extends above the drive pinion shaft. In this case, the feed oil passage and its inlet are placed at a position where the flow of the lubricant scooped up by the ring gear cannot easily enter therein. According to the arrangement of the feed oil passage and its inlet, the inflow of the lubricant to the inlet of the feed oil passage is restrained, thereby making it possible to restrain lubricant in which a foreign matter is mixed from being supplied to the rolling bearings.

Thus, according to the differential gear of one aspect of the disclosure, it is possible to restrain a failure occurrence at the time of lubrication of a rolling bearing included in a final drive mechanism.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 5 is a view illustrating a height of a lubrication oil level inside a pinion shaft chamber with respect to the number of rotations of a drive pinion shaft.

DETAILED DESCRIPTION OF EMBODIMENTS

An embodiment is described below with reference to the drawings.

Figure 1:
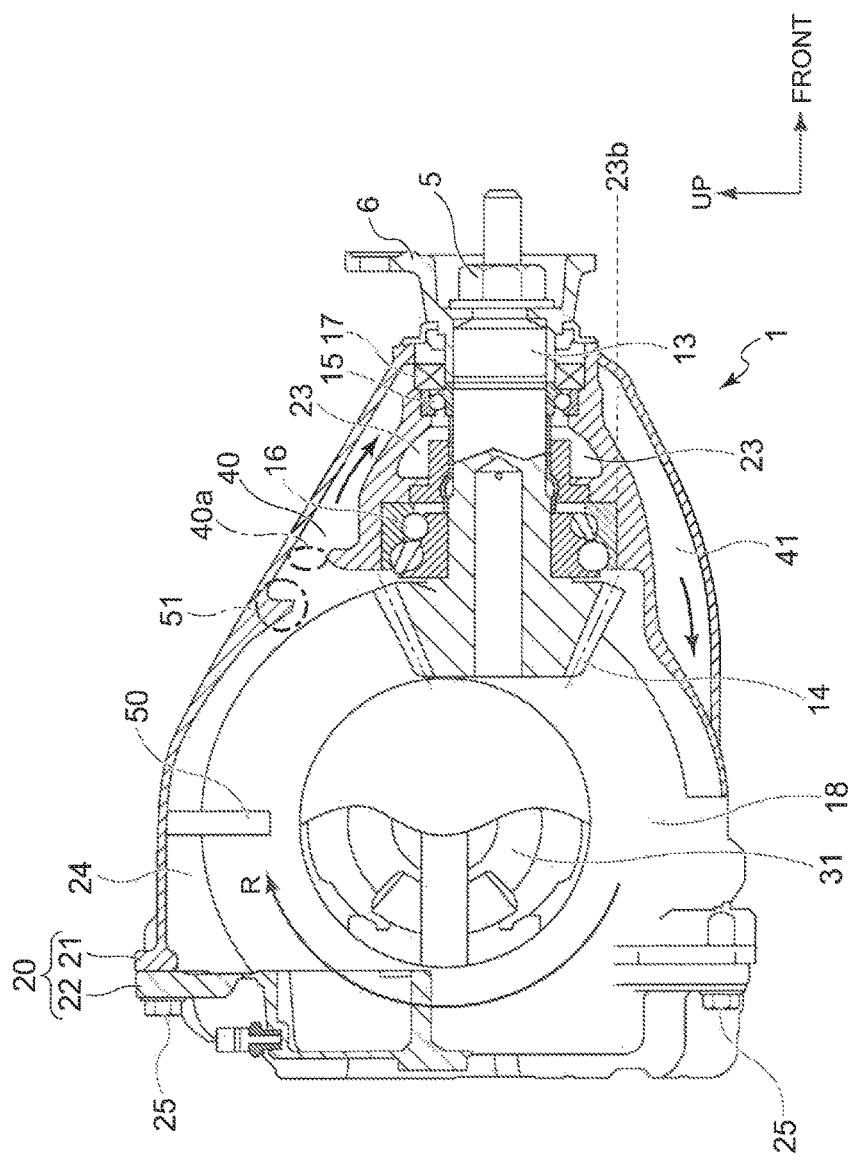
FIG. 1 is a side sectional view of a differential gear for a vehicle according to an embodiment of the disclosure.
Figure 2:
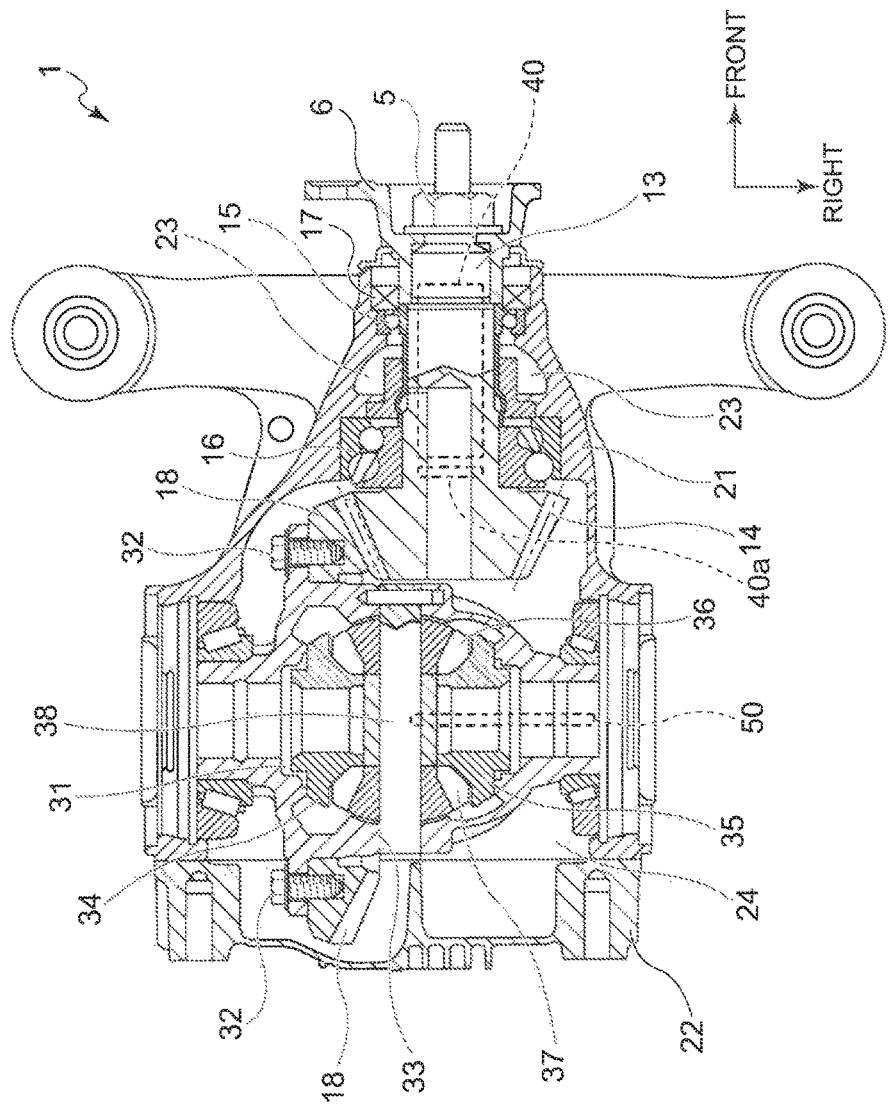
FIG. 2 is a plan sectional side view of the differential gear for the vehicle according to the embodiment of the disclosure.

FIG. 1 is a side sectional view of a differential gear (a differential) for a vehicle according to the embodiment, and FIG. 2 is a plan sectional view of the differential gear. The differential gear of the present embodiment is an example of a differential gear for rear wheel drive in an FR (front-engine rear-drive) vehicle, for example. Note that, in FIGS. 1 and 2, a direction indicated by an arrow "FRONT" is a front side of the vehicle.

As illustrated in FIG. 1, the differential gear 1 is constituted by a differential housing 20, a final drive mechanism including a drive pinion shaft 13, a drive pinion gear 14, drive pinion bearings 15, 16, a ring gear 18, and the like, a differential gear mechanism 31, and so on.

The differential housing 20 is constituted by a differential carrier 21, and a carrier cover 22. The carrier cover 22 is fitted and fastened to a rear opening of the differential carrier 21 with bolts 25, and thus, the differential housing is integrally formed. Note that FIG. 1 illustrates only some of a plurality of bolts.

A pinion shaft chamber 23 is formed in a front part (a vehicle front side) of the differential carrier 21, and the drive pinion bearings 15, 16 are accommodated in the pinion shaft chamber 23. The drive pinion shaft 13 is rotatably supported support by the drive pinion bearings 15, 16.

Note that, as illustrated in FIGS. 1 and 2, the differential gear of the present embodiment uses an angular contact ball bearing (single row, double row), which is one type of a rolling bearing as the drive pinion bearings 15, 16, which are the rolling bearing, for the purpose of loss reduction. However, the disclosure is not limited to this. The bearing may be a tapered roller bearing or the like, which is generally used in the differential gear, for example.

A flange 6 is fastened to one end (the vehicle front side) of the drive pinion shaft 13 with a nut 5. Note that an oil seal 17 is provided between the flange 6 and the drive pinion bearing 15 of the pinion shaft chamber 23, which prevents lubricant supplied to the pinion shaft chamber 23 from leaking outside the differential carrier 21.

The flange 6 is connected to a last end of a propeller shaft (not shown) by fastening bolts (not shown). The propeller shaft transmits power of an engine (not shown) provided in a vehicle front portion.

The drive pinion gear 14 is formed integrally with a shaft end of the drive pinion shaft 13 on a side opposite to the flange 6, and the drive pinion gear 14 meshes with the ring gear 18.

Due to a gear ratio between the drive pinion gear 14 and the ring gear 18, a rotational driving force of the drive pinion shaft 13 is decelerated, and the driving force thus decelerated is transmitted to the ring gear 18.

The drive pinion gear 14 and the ring gear 18 are constituted by use of a bevel gear, a hypoid gear, which is one type of the bevel gear, or the like. Note that, in a case where the hypoid gear is used, an axial direction in the rotation of the ring gear 18 is placed at a skew position where the axial direction is perpendicular to an axial direction of a rotation of the drive pinion shaft 13 in a plan view.

The ring gear 18 is accommodated in the differential mechanism chamber 24 formed in a rear part (a vehicle rear side) inside the differential carrier 21 together with the differential gear mechanism 31.

As illustrated in FIG. 2, the differential gear mechanism 31 is constituted by a differential case 33, side gears 34, 35, differential pinions 36, 37, a differential pinion shaft 38, and the like.

Note that the ring gear 18 is fixed to the differential case 33 with bolts 32, so the ring gear 18 is rotatable integrally with the differential case 33.

In a hollow portion of the differential case 33, the differential pinion shaft 38 is held in a direction perpendicular to a center line serving as a central axis at the time of a rotation of the differential case 33, and a pair of differential pinions 36, 37 are rotatably supported by both shaft ends of the differential pinion shaft 38 so as to be rotatable in reverse directions to each other.

A pair of side gears 34, 35 disposed on right and left sides in the hollow portion of the differential case 33 across the differential pinion shaft 38 mesh with the differential pinions 36, 37. Further, one ends of right and left axles (not shown) inserted into the differential case 33 are integrally rotatably connected to the side gears 34, 35, respectively.

Note that right and left wheel assemblies (not shown) are connected to the other ends of the right and left axles, respectively.

In the differential gear 1 thus configured, a driving force of the engine (not shown) is changed by a transmission (not shown), and the driving force thus changed is transmitted to the propeller shaft (not shown).

When the propeller shaft (not shown) rotates by the transmission of the driving force so as to rotate the drive pinion gear 14 of the drive pinion shaft 13 connected thereto, the ring gear 18 meshing with the drive pinion gear 14 and the differential case 33 to which the ring gear 18 is bolt-fastened are rotationally driven together.

Note that the ring gear 18 rotates in a direction indicated by an arrow R in FIG. 1 when the vehicle moves forward.

Due to the rotation of the differential ease 33, the side gears 34, 35, the differential pinions 36, 37, and the differential pinion shaft 38, which are provided in the hollow portion of the differential case 33, and the right and left axles (not shown) inserted into the differential case 33 are rotationally driven together.

Due to the rotation of the axles, the right and left wheel assemblies (not shown) connected to the shaft ends of the right and left axles, respectively, are rotationally driven.

The differential gear mechanism 31 is driven so that the right and left wheel assemblies rotate differentially at the time of driving the right and left axles, as is generally known.

In the differential housing 20 of FIG. 1 configured as described above, lubricant is accumulated in a bottom part of the differential mechanism chamber 24 formed in the differential carrier 21, and when the ring gear 18 accommodated in the differential mechanism chamber 24 rotates to scoop up the lubricant, the final drive mechanism, the differential gear mechanism, the rolling bearings, and the like are lubricated.

More specifically, when the drive pinion gear 14 of the drive pinion shaft 13 is rotationally driven, the ring gear 18 meshing with the drive pinion gear 14 rotates due to the driving of the drive pinion gear 14. The lubricant in the bottom part of the differential mechanism chamber 24 is then scooped up by the rotation of the ring gear 18, and the final drive mechanism, the differential gear mechanism, and the like in the differential mechanism chamber 24 are lubricated by the lubricant thus scooped up.

Here, in the differential housing 20, a feed oil passage 40 for supplying, to the pinion shaft chamber 23, the lubricant scooped up by the rotation of the ring gear 18, and a return oil passage 41 for discharging the lubricant in the pinion shaft chamber 23 to the differential mechanism chamber 24 are provided.

The lubricant thus scooped up due to the rotation of the ring gear 18 flows into an inlet of the feed oil passage 40 and enters the pinion shaft chamber 23 through the feed oil passage 40. As such, by the lubricant supplied to the pinion shaft chamber 23, the drive pinion bearings (rolling bearings) 15, 16, and the like accommodated in the pinion shaft chamber 23 are lubricated. The lubricant after the lubrication is discharged to the differential mechanism chamber 24 through the return oil passage 41.

In the meantime, in order to restrain a failure occurrence at the time of lubrication of the rolling bearings in a poor lubrication state, it is necessary to restrain the supply of the lubricant to the rolling bearings, so as not to immerse the whole rolling bearings in lubricant in which a foreign matter is mixed, as much as possible, as described above.

However, in a case where an amount of the lubricant to be supplied to the rolling bearings is too small, a failure occurs due to oil film shortage. In order to cope with both, it is necessary to provide a constant supply amount of the lubricant regardless of the number of rotations of the ring gear.

In view of this, in the differential gear of the present embodiment, in order to provide a constant supply amount of the lubricant to the rolling bearings, the feed oil passage has the following structure.

As apparent from in FIGS. 1 and 2, the feed oil passage 40 is provided on the vehicle front side inside the differential carrier 21 of the differential housing 20, and the whole feed oil passage 40 is formed so as to extend above the drive pinion shaft 13 in an axial direction thereof.

In this case, the feed oil passage 40 is placed at a position where a flow of the lubricant scooped up by the rotation of the ring gear 18 cannot easily enter the feed oil passage 40.

In the differential gear of the present embodiment, in order to supply the lubricant to the pinion shaft chamber 23, a side, of the feed oil passage 40, which serves as an outlet for the lubricant communicates with the pinion shaft chamber 23.

In the meantime, a side, of the feed oil passage 40, where the lubricant flows in communicates with the differential mechanism chamber 24, and an inlet for the lubricant is formed at a position away from the ring gear 18.

Figure 3:
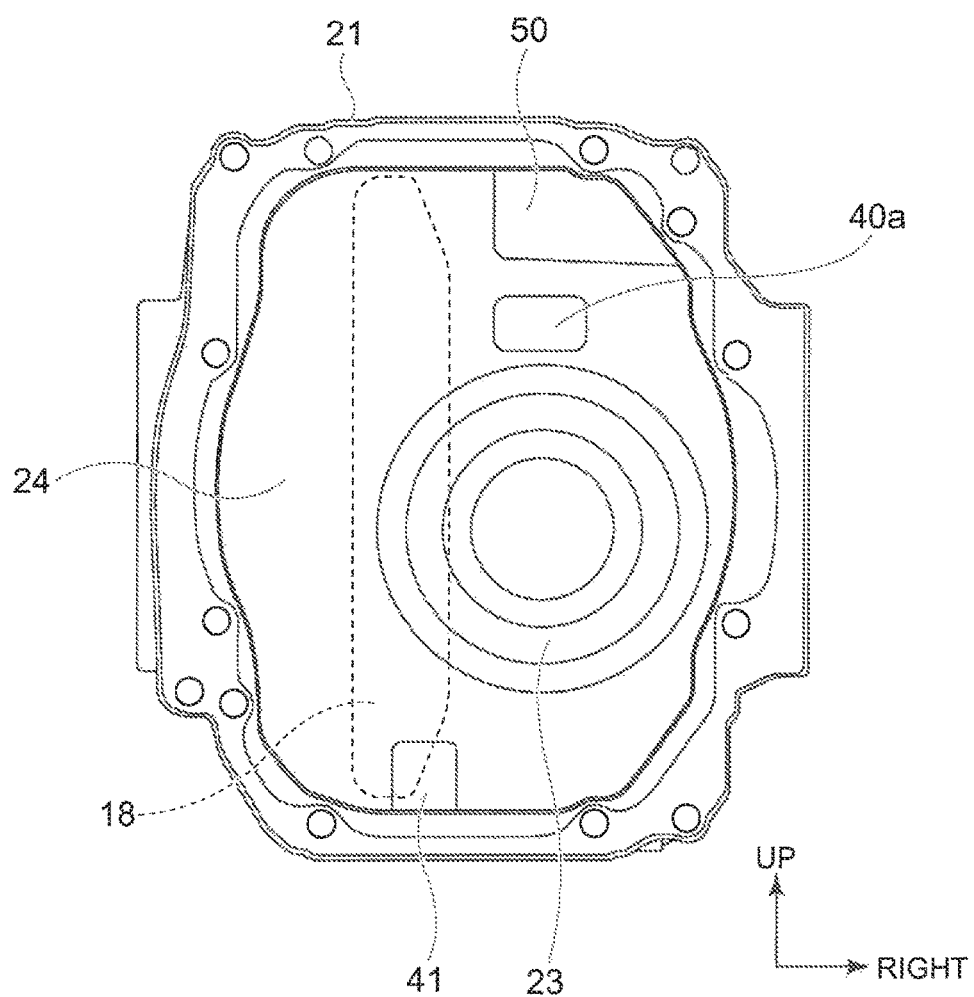
FIG. 3 is a view illustrating a configuration of an inner side of a differential carrier, when viewed from a vehicle rear side.

An arrangement of the inlet of the feed oil passage 40 is described more specifically, with reference to FIG. 3. FIG. 3 is a view illustrating a configuration of an inner side of the differential carrier 21, when viewed from the vehicle rear side. Note that a direction indicated by an arrow "UP" is an upper side of the vehicle in the figure.

As illustrated in FIG. 3, an inlet 40a of the feed oil passage 40 is placed inside the differential carrier 21 at a position that is offset from the ring gear 18 in an axial direction (a right side in FIG. 3) of the ring gear, so as to restrain an inflow of the lubricant to the feed oil passage 40.

That is, as illustrated in FIG. 3, when viewed in the axial direction of the drive pinion shaft 13, a contour of the ring gear 18 does not overlap with the inlet 40a at all.

Accordingly, the inflow of the lubricant scooped up by the rotation of the ring gear 18 to the inlet 40a of the feed oil passage 40 is restrained in comparison with a conventional configuration in which a contour of a ring gear has a part overlapping with an inlet of a feed oil passage, when viewed from the same viewpoint.

Accordingly, in the differential gear of the present embodiment, it is possible to restrain the supply of the lubricant to the rolling bearings.

Further, in a case where the feed oil passage is formed as the structure described above, an outer wall of the feed oil passage 40 is formed as a continuous surface integrated with an outer wall of the differential carrier 21 so as to surround the pinion shaft chamber 23 that accommodates the drive pinion shaft 13 into which a rotational driving force of the engine (not shown) is input.

Accordingly, unlike the conventional technique, it is not necessary to form a special wall surface having a projecting or recessed structure as an inner wall surface or an outer wall surface of a differential carrier so as to provide a feed oil passage.

That is, a stress caused around the differential carrier, particularly, a pinion shaft chamber inside the differential carrier, due to an occurrence of a reaction force by meshing or the like between gears of a final drive mechanism against a rotational driving force of an engine is easily concentrated on a root part where such a special wall surface is formed. This results in that rigidity in the above part decreases in the conventional differential carrier.

However, in the differential gear of the present embodiment, the feed oil passage 40 is formed on the vehicle front side inside the differential carrier 21 such that the whole feed oil passage 40 extends above the drive pinion shaft 13 in the axial direction thereof.

Accordingly, the outer wall of the feed oil passage 40 is formed as the continuous surface integrated with the outer wall of the differential carrier 21 so as to surround the pinion shaft chamber 23 that accommodates the drive pinion shaft 13 therein.

As a result, a stress to be caused around the pinion shaft chamber 23 is dispersed over the whole outer wall surface of the differential carrier 21.

Accordingly, in the differential gear of the present embodiment, it is possible to improve the rigidity of the differential carrier 21 in the differential housing 20 more than the conventional technique.

In the meantime, in the differential gear of the present embodiment, the inflow of the lubricant scooped up by the rotation of the ring gear 18 to the inlet 40a of the feed oil passage 40 can be restrained by the structure of the feed oil passage 40 and the arrangement of the inlet 40a.

However, in the lubricant scooped up by the rotation of the ring gear 18, some lubricant to directly flow into the inlet 40a of the feed oil passage 40 flows into the inlet 40a.

In view of this, in the differential gear of the present embodiment, in order to further restrain the supply of the lubricant to the rolling bearings, a restraining member for restraining an inflow of the lubricant to directly flow into the inlet of the feed oil passage is provided inside the differential carrier.

More specifically, a restraining member 50 is provided on a raceway (an inflow raceway) before the lubricant scooped up by the rotation of the ring gear 18 directly flows into the inlet 40a of the feed oil passage 40, inside the differential carrier 21.

Figure 4:
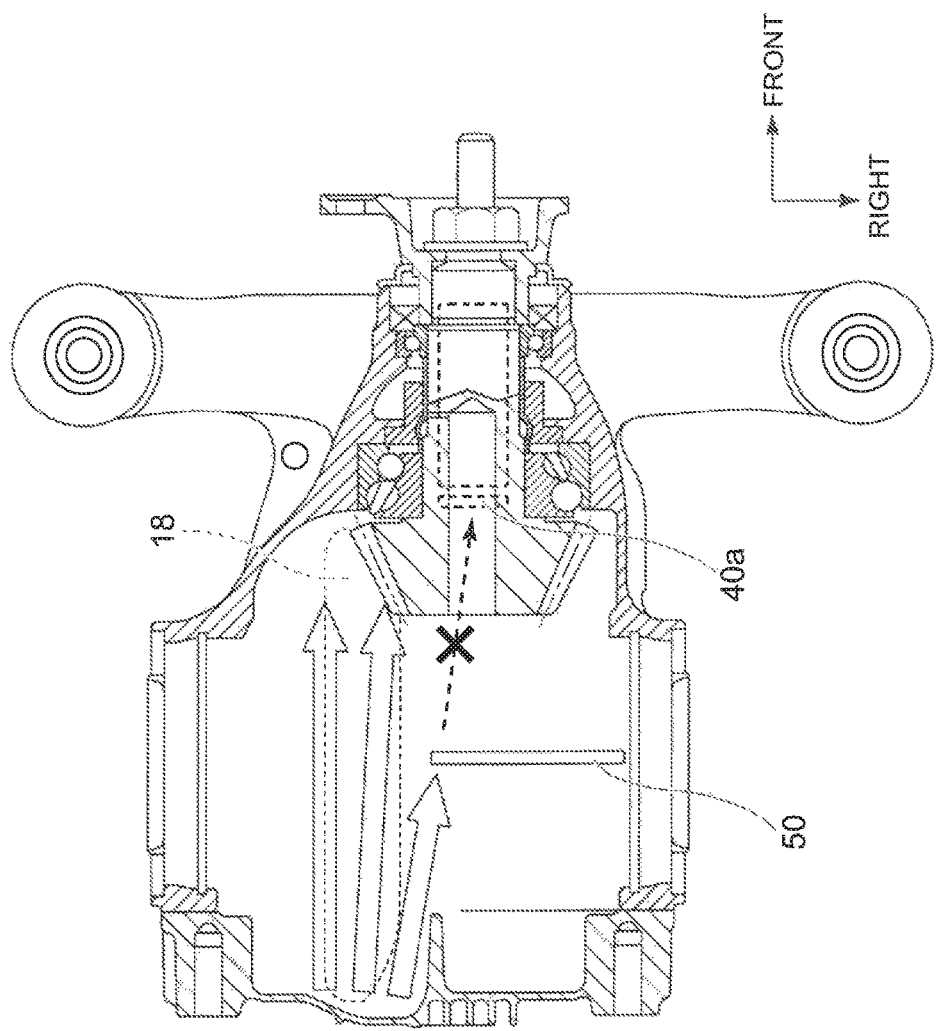
FIG. 4 is a view illustrating an inflow suppressant effect of lubricant by a restraining member.

FIG. 4 is a view illustrating an inflow suppressant effect of the lubricant by the restraining member 50.

As illustrated in the figure, the restraining member 50 restrains a flow of the lubricant to directly flow into the inlet 40a of the feed oil passage 40, out of a main flow of the lubricant scooped up by the rotation of the ring gear 18.

This accordingly restrains the inflow of the lubricant to directly flow into the inlet 40a of the feed oil passage 40.

Further, some of the lubricant scooped up by the rotation of the ring gear 18 does not directly flow into the inlet 40a of the feed oil passage 40 like above, but flows into the inlet 40a of the feed oil passage 40 from an upper part of the differential mechanism chamber 24 inside the differential carrier 21 in FIG. 1 along an inner wall surface thereof. It is necessary to restrain the inflow thereof.

In view of this, in the differential gear of the present embodiment, a projecting structure 51 extending downward is provided on an upper inner wall surface of the differential mechanism chamber 24, at a position spaced toward a ring-gear-18 side along the axial direction of the drive pinion shaft 13 from a position of the inlet 40a of the feed oil passage 40 on the inflow raceway.

Due to the projecting structure 51, the lubricant to flow into the inlet 40a from the upper part of the differential mechanism chamber 24 along the inner wall surface is dropped down to the bottom part of the differential mechanism chamber 24 before the lubricant reaches the inlet 40a of the feed oil passage 40. This restrains the lubricant to flow as such from flowing into the inlet 40a of the feed oil passage 40. An inflow of the lubricant to directly flow into the inlet 40a of the feed oil passage 40, of the lubricant scooped up by the ring gear 18, is restrained by the restraining member 50 provided on an inflow raceway. In addition, an inflow of the lubricant to the inlet 40a of the feed oil passage 40 from an upper part of the differential mechanism chamber 24 along the inner wall surface thereof is restrained by the projecting structure 51. However, lubricant indirectly flowing into the inlet 40a of the feed oil passage 40 such as lubricant which hits an inner wall inside the differential carrier 21 and bounces off and flows along the inner wall to a side way, or is scooped up by a rotating member of the differential gear mechanism 31, of the lubricant scooped up by the ring gear 18 is not restrained by the restraining member 50 or the projecting structure 51. Thus, such lubricant flows into the pinion shaft chamber 23. A case in which a height of the lubricant oil level inside the pinion shaft chamber 23 cannot be maintained at a height suitable to lubricate the rolling bearing accommodated therein is possible, if the restraining member 50 restrains the flow of all lubricant to directly flow into the inlet 40a of the feed oil passage 40. Thus, the lubricant oil level needed to maintain a height of a surface of the lubricant, of lubricant to directly flow into the inlet 40a of the feed oil passage 40 causes to flow into the inlet 40a of the feed oil passage 40. In order to avoid the lubricant flowing into the inlet 40a much more, there is a need to set a position at which the restraining member 50 and/or the projecting structure 51 is provided inside the differential carrier 21, and size (area) of the restraining member 50 and/or the projecting structure 51.

Accordingly, in the differential gear of the present embodiment, it is possible to further restrain the supply of the lubricant to the rolling bearings.

In the meantime, as described above, in the conventional technique, when the rotation speed (the number of rotations) of the ring gear increases, the amount of the lubricant to be scooped up accordingly is increased.

As a result, the amount of the lubricant flowing into the inlet of the feed oil passage also increases, and the amount eventually exceeds the amount of the lubricant discharged from the return oil passage to the differential mechanism chamber.

As a result, a height of a lubricant oil level in the pinion shaft chamber exceeds a height at which the whole rolling bearings accommodated therein are immersed, which frequently causes a poor lubrication state in which the whole rolling bearings are immersed in the lubricant in which a foreign matter is mixed.

In view of this, in the differential gear of the present embodiment, the inlet 40a of the feed oil passage 40, the restraining member 50 and the projecting structure 51 are placed at a position where a fluctuation in an amount of the lubricant to be supplied to the pinion shaft chamber 23 can be restrained within a predetermined range, and thereby maintaining a height of the lubricant oil level inside the pinion shaft chamber 23 at a height suitable to lubricant the rolling bearings even if the rotation of the ring gear 18 fluctuates. The fluctuation in the amount of the lubricant to be supplied is caused due to a fluctuation in the number of rotations of the ring gear 18.

Note that the predetermined range is determined so that the standard of the lubricant oil level inside the pinion shaft chamber 23 has a height suitable for the lubrication in consideration of a fluctuation in the amount of the lubricant to flow into the inlet 40a of the feed oil passage 40, that is, the amount of the lubricant to be supplied to the pinion shaft chamber 23, based on the amount of the lubricant to be discharged to the differential mechanism chamber 24 through the return oil passage 41.

For example, the predetermined range is determined so that the standard of the lubricant oil level becomes a height that is lowered by ⅔ of a distance from an axial center of the drive pinion shaft 13 accommodated in the pinion shaft chamber 23 to a bottom face (23b in FIG. 1) of the pinion shaft chamber 23.

It is particularly preferable to set this height so that the lubricant oil surface is lower than a gap between an outer ring and an inner ring of a large-diameter one (the drive pinion bearing 16) of two rolling bearings (the drive pinion bearings 15, 16) as lubrication targets in the pinion shaft chamber 23, for example.

With such an arrangement of the inlet 40a of the feed oil passage 40, the restraining member 50 and the projecting structure 51, even when the rotation speed (the number of rotations) of the ring gear 18 increases, a fluctuation of the inflow of the lubricant scooped up by the rotation of the ring gear 18 to the inlet 40a of the feed oil passage 40 is restrained within the predetermined range.

Accordingly, even if the number of rotations of the ring gear 18 fluctuates, the standard of the lubricant oil level inside the pinion shaft chamber 23 is maintained within the predetermined range that attains a height suitable for the lubrication.

FIG. 5 is a view illustrating a height of the lubrication oil level inside the pinion shaft chamber 23 with respect to the number of rotations of the drive pinion shaft 13.

As illustrated in the figure, in the conventional technique, the height of the lubricant oil level inside the pinion shaft chamber 23 gradually rises along with an increase in the number of rotations of the ring gear 18 due to an increase in the number of rotations of the drive pinion shaft 13.

However, in the differential gear of the present embodiment, when the number of rotations of the ring gear 18 reaches a given number of rotations, even if the number of rotations rises after that, the height of the lubricant oil level inside the pinion shaft chamber 23 is maintained at a height suitable for the lubrication. According to the differential gear of the present embodiment, by the above-described arrangement of the inlet 40a of the feed oil passage 40, the restraining member 50 or the projecting structure 51, an increase of flow of lubricant oil flowing into the feed oil passage 40 due to a rise of a number of rotations (a rotation speed) of the ring gear 18 is restrained at small. The number of rotations (the rotation speed) of the ring gear 18 increases, and the number of rotations (a rotation speed) of the drive pinion gear 14 meshing with the ring gear 18 increases, and a rotational speed of the rolling bearings (the drive pinion bearings 15, 16) supporting the drive pinion shaft 13 provided with the gear increases. It is conceivable that, if the rotation speed of the rolling bearings increases, by pump performance following a rotation of the rolling bearings, an exhaust of the lubricant oil inside the pinion shaft chamber 23 to the return oil passage 41 speeds up, and amount of oil exhausted from the return oil passage 41 increases. After the increased amount of the exhausted oil matches (becomes equal to) an increased amount of oil flowing into the feed oil passage 40 due to the rise of a number of rotation (rotational speed) of the ring gear 18, even if a number of rotation (a rotational speed) of the ring gear 18 increases, a height of the lubricant oil level inside the pinion shaft chamber 41 is maintained at a height suitable to lubricate the rolling bearings, as shown in FIG. 5.

Accordingly, in the differential gear of the present embodiment, it is possible to restrain the supply of the lubricant to the rolling bearings.

As described above, since the differential gear of the present embodiment can restrain the supply of the lubricant to the rolling bearings, it is possible to restrain a failure occurrence at the time of lubrication of the rolling bearings included in the final drive mechanism.

Note that the above description deals with an example of the differential gear for rear wheels. However, the differential gear of the present embodiment is not limited to this, and is also applicable to a differential gear for front wheels.

Further, the above description deals with a case where the inlet 40a of the feed oil passage 40 is placed at a position that is offset on the "right side" (see FIG. 3) in the axial direction of the ring gear, as an example in which the inlet 40a of the feed oil passage 40 is placed at a position that is offset from the ring gear 18 in the axial direction of the ring gear inside the differential carrier 21. However, its arrangement position is not limited to this, and in a case where the ring gear and the differential gear mechanism to which the ring gear is bolt-fastened are laid out on the right side, which is reverse to the arrangement in FIG. 3, the inlet 40a of the feed oil passage 40 may be placed at a position that is offset on the "left side" in the axial direction of the ring gear.

What is claimed is:
1. A differential gear configured to be mounted on a vehicle, the differential gear comprising:
   a differential housing;
   a ring gear accommodated in the differential housing;
   a drive pinion shaft accommodated in the differential housing and having a pinion gear meshing with the ring gear; and
   rolling bearings accommodated in the differential housing and supporting the drive pinion shaft such that the drive pinion shaft is rotatable, wherein
      the differential housing includes:
         a differential mechanism chamber in which to accommodate the ring gear, and
         a pinion shaft chamber in which to accommodate the rolling bearings;
      a feed oil passage configured to supply lubricant scooped up by the ring gear to the pinion shaft chamber, and a return oil passage configured to discharge the lubricant in the pinion shaft chamber to the differential mechanism chamber are provided inside the differential housing;
      when the vehicle moves forward, the ring gear rotates in a direction such that a portion of the ring gear that meshes with the pinion gear moves downward with respect to the pinion gear;
      an inlet of the feed oil passage is located such that the inlet does not overlap with a contour of the ring gear when viewed in an axial direction of the drive pinion shaft, at a position that is above the drive pinion shaft and offset from the ring gear in an axial direction of the ring gear; and
      a restraining member extends inward from an outer wall of the differential housing and overlaps the ring gear when viewed in the axial direction of the ring gear, the restraining member being configured to suppress an inflow of the lubricant scooped up by the ring gear and directly flowing to the inlet of the feed oil passage, the restraining member being positioned on a raceway on which the lubricant flows directly to the inlet.

2. The differential gear according to claim 1, wherein the entire feed oil passage extends above the drive pinion shaft.

3. The differential gear according to claim 1, wherein an outer wall of the feed oil passage is formed as a continuous surface integrated with an outer wall of the differential housing so as to surround the pinion shaft chamber and accommodate the drive pinion shaft.

4. The differential gear according to claim 1, further comprising a projecting portion extending downward and provided on an upper inner wall surface of the differential mechanism chamber, the projecting portion being positioned toward a ring-gear side along the axial direction of the drive pinion shaft from a position of the inlet of the feed oil passage on a raceway on which the lubricant flows directly to the inlet.

5. The differential gear according to claim 1, wherein the restraining member is located above the inlet of the feed oil passage when viewed in the axial direction of the drive pinion shaft.

\* \* \* \* \*